Jan. 22, 1924.
H. G. HALL
1,481,363
ADVERTISING DEVICE FOR VEHICLE WHEELS
Filed Jan. 31, 1923
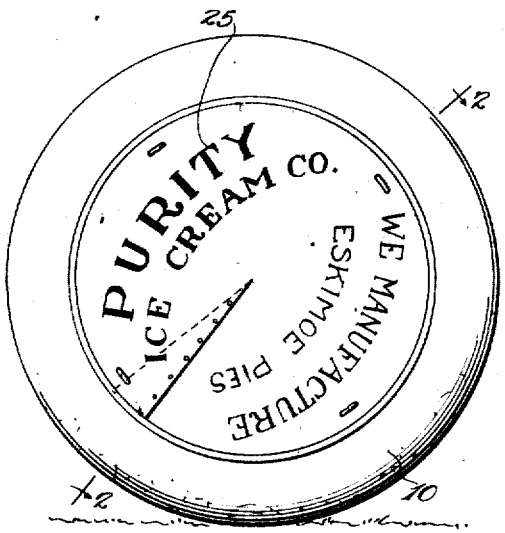
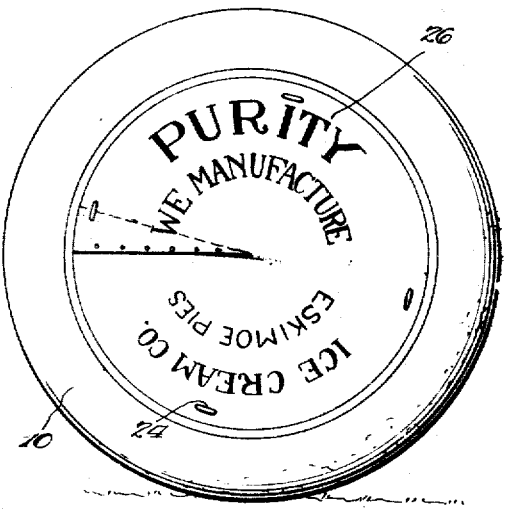
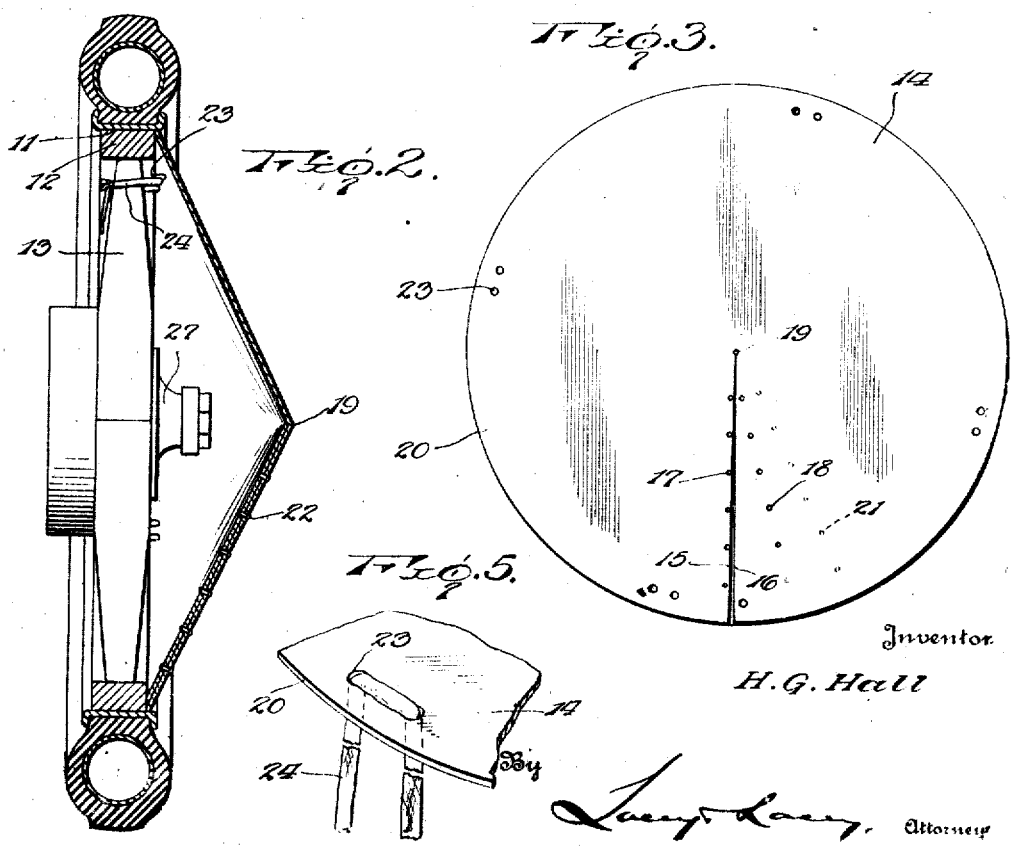

Patented Jan. 22, 1924.

1,481,363

UNITED STATES PATENT OFFICE.

HAROLD G. HALL, OF YONKERS, NEW YORK.

ADVERTISING DEVICE FOR VEHICLE WHEELS.

Application filed January 21, 1923. Serial No. 616,125.

*To all whom it may concern:*

Be it known that I, HAROLD G. HALL, a citizen of the United States, residing at Yonkers, in the county of Westchester and State of New York, have invented certain new and useful Improvements in Advertising Devices for Vehicle Wheels, of which the following is a specification.

This invention relates to an advertising device consisting of a conical attachment for vehicle wheels. This attachment may be manufactured of cardboard or sheet metal. In the former case the advertising matter may be printed directly on the cardboard and in the latter case, the advertising matter may be printed on thin paper and pasted on the outer side of the cone.

By constructing this device as a cone, the advantage is gained, that the same blank may be used for different size wheels, so that, for instance, if the blank is cut or stamped out to fit a large wheel, it is possible to use the plate by overlapping the edges more to also fit a wheel of smaller diameter.

The blank, whether made of plate or cardboard is cut out as a circular disk and slit open along a radial line. The edges along this line are then made to overlap each other and a line of rivets placed along the outer radial edge. In this manner a smaller diameter is created for the base of the cone, while the apex thereof extends sufficiently far from the base to permit the hub of the wheel to be comfortably housed in the cone.

In advertising announcements requiring change from day to day, as in the case of political campaigns, the cardboard construction is preferable, being less expensive, while for advertising merchandise such as tobacco, candies, remedies, and the like, the tin construction is preferable being more durable. The latter construction is also preferable for announcements by theaters for instance, because paper advertisements may be pasted on the tin cone and easily exchanged as the program of the theater changes.

The diameter at the base of the cone is made of a size to coincide with the rim of the wheel, so that the spokes and hub are entirely covered. Along the edge of the cone are provided securing means for attaching the cone to the spokes of the wheel. This is preferably done by straps or laces, which are passed through eyelets provided at the base of the cone, which straps or laces are tied around the respective spokes.

In the accompanying drawing one embodiment of the invention is illustrated, and;

Figure 1 is a side elevation of the advertising cone inserted in an automobile wheel and carrying one type of advertising matter;

Figure 2 is a section along line 2—2 of Figure 1, in slightly larger scale;

Figure 3 is a plan view of a blank cut out to form a cone;

Figure 4 is a similar view to Figure 1 with the advertising matter arranged in different manner; and Figure 5 is a fragmentary perspective view of the bottom edge of the cone with the securing means in position.

In the drawings reference numeral 10 represents the rubber shoe of a pneumatic tire and reference numeral 11, the wheel rim, while reference numeral 12 represents the felloe and 13, the spokes of the wheel.

The blank from which the plate or cardboard cone is made is illustrated in Figure 3, where reference numeral 14 represents a circular disk of any suitable diameter. This disk is slit along a radial line to form two opposing edges 15 and 16. Along the edge 15, is shown a series of apertures 17 and along a radial line at a slight angle to edge 16 is provided another row of apertures 18. By laying the edge 15 over the edge 16, the periphery 20 of the disk will be contracted and the center 19 thereof will be raised so that the latter forms the apex and the former 20, forms the base of the cone. The lines of apertures 17 and 18 are then made to coincide, and rivets, bolts or the like 22, applied, inserted in the apertures to rigidly secure the edges together. It is evident that by providing several radial lines of apertures, as for instance, at 21, a smaller base for a cone will be the result as the periphery 20 contracts more and more, and the apex 19 being correspondingly raised above the base.

A short distance in from the bottom edge of the base of the cone are provided eyelets 23 intended to carry straps or laces 24, by means of which the cone is secured on the wheel, as best seen in Figure 2. These eyelets are placed at uniform distance opposite the spokes along the base or lower edge of the cone, as seen in Figure 3.

Upon the outer surface of the cone the advertising matter is applied either in arcuate formation 25, as seen in Figure 1, or in circumferential formation 26, as seen in Figure 4. It is evident that the advertising matter may also be arranged radially or in any other suitable manner. As already stated, the advertising matter may be painted directly on the outer surface of the cone or may be printed in the form of circular posts and pasted on the outside of the cone.

Referring particularly to Figure 2, the base of the cone coincides with the edge of the rim 11 and abuts against the same to be supported thereby in vertical direction. The apex 19 projects in axial direction from the wheel sufficiently to comfortably house the wheel hub 27.

It is evident that, by using straps or laces to secure the disks, they may readily be applied or detached or exchanged if the advertisement is to be changed and these disks will form practically no obstruction in repairing or demounting the wheel.

When the cone is made of cardboard or similar light and comparatively loose material, the edges of the disk may be secured together by a row of stitching or by paste instead of by riveting.

It is evident that the display cones may also be used at athletic or other contests to carry college or other colors instead of advertisements, particularly in connection with baseball or football games, boat, horse, bicycle and automobile races, and the like.

Having thus described the invention what is claimed as new is:

1. An advertising device for wheels, comprising a circular disk having a radial slit and provided with advertising matter on one side thereof, the edges along said slit placed in overlapping position and rigidly secured together whereby a hollow body with an uninterrupted conical surface is formed adapted to be secured along its base to a wheel in such a manner that the apex of the cone surface coincides with the axis of the wheel.

2. An advertising device for wheels, comprising a circular disk having a radial slit and provided with advertising matter on one side thereof, the edges along said slit placed in overlapping position and rigidly secured together whereby a cone is formed, and means along the bottom edge of the cone for attaching the same to a wheel.

3. An advertising device for wheels, comprising a circular disk having a radial slit and provided with advertising matter on one side thereof, the edges along said slit placed in overlapping position and rigidly secured together whereby a cone is formed, and means along the bottom edge of the cone for attaching the same to a wheel, said attaching means including laces engaged in suitable eyelets provided along the bottom edge of the cone and adapted to engage the spokes of the wheel.

4. An advertising device for wheels, comprising a circular disk having a radial slit and provided with advertising matter on one side thereof, the edges along said slit placed in overlapping position and provided with a series of apertures, securing elements selectively engaging with said apertures to rigidly secure said edges together, whereby a cone is formed, and means along the bottom edge of the cone for attaching the same to a wheel, said attaching means including laces engaged in suitable eyelets provided along the bottom edge of the cone and adapted to engage the spokes of the wheel, the base of the cone being adjustable to wheels of different diameters through the intermediary of said apertures and securing elements.

In testimony whereof I affix my signature.

HAROLD G. HALL. [L. S.]